(12) United States Patent
Hussaini et al.

(10) Patent No.: US 7,584,520 B2
(45) Date of Patent: Sep. 8, 2009

(54) WINDSHIELD WIPER ARM AND ADAPTOR ASSEMBLY

(75) Inventors: Saied Hussaini, Miami, FL (US); Marc Iacovelli, Miami, FL (US)

(73) Assignee: Rally Manufacturing, Inc., Miami, FL (US)

( * ) Notice: Subject to any disclaimer, the term of this patent is extended or adjusted under 35 U.S.C. 154(b) by 806 days.

(21) Appl. No.: 11/183,904

(22) Filed: Jul. 19, 2005

(65) Prior Publication Data

US 2007/0017054 A1    Jan. 25, 2007

(51) Int. Cl.
*B60S 1/40* (2006.01)
(52) U.S. Cl. .................................. 15/250.32
(58) Field of Classification Search ............. 15/250.32, 15/250.31, 250.361, 250.351
See application file for complete search history.

(56) References Cited

U.S. PATENT DOCUMENTS

| 4,878,263 | A | 11/1989 | Raymond |
| 5,084,933 | A | 2/1992 | Buechele |
| 5,289,608 | A | 3/1994 | Kim |
| 5,611,103 | A | 3/1997 | Lee |
| 5,937,474 | A | 8/1999 | Hussaini |
| 6,332,236 | B1 | 12/2001 | Ku |
| 6,353,962 | B1 | 3/2002 | Matsumoto et al. |
| 6,539,576 | B2 | 4/2003 | Kim |
| 6,591,445 | B2 * | 7/2003 | Nacamuli ................ 15/250.32 |
| 6,640,380 | B2 * | 11/2003 | Rosenstein et al. ....... 15/250.32 |
| 6,658,690 | B1 | 12/2003 | Westermann et al. |
| 2002/0174505 | A1 * | 11/2002 | Kim ........................ 15/250.32 |

FOREIGN PATENT DOCUMENTS

WO    2004/069618    *    8/2004

* cited by examiner

*Primary Examiner*—Gary K Graham
(74) *Attorney, Agent, or Firm*—Berenato, White & Stavish, LLC

(57) ABSTRACT

A windshield wiper frame connector assembly for a windshield wiper assembly for motor vehicles which accommodates different size wiper arms, wherein the assembly accommodates connectors adapted to receive regular and large hook type wiper arms, pin type wiper arms, reverse hook arms, or straight and two-hole bayonet type wiper arms. The wiper blade frame is designed to accommodate a majority of commercial vehicle wiper arms.

11 Claims, 8 Drawing Sheets

WINDSHIELD WIPER ARM AND ADAPTOR ASSEMBLY

BACKGROUND OF THE INVENTION

1. Field of the Invention

The present invention relates generally to the construction of a windshield wiper frame and connector and more particularly, to an improved wiper arm and blade unit connector assembly for windshield wipers, whereby the wiper frame accommodates a versatile connector in a manner that permits easy assembly and replacement of the wiper arm.

2. Description of the Prior Art

Various types of windshield wiper arm and blade unit connectors for a windshield wiper assembly are well known. Such windshield wiper frame connectors include a pair of apertured ears pivotally connected to a pin of the pin type wiper arm. However, such prior art wiper frame connectors are costly to manufacture and difficult to assemble with the wiper arm and the blade unit due to their complicated structure. Furthermore, such prior art connectors are incapable of receiving the widely used hook type arm of the windshield wiper assembly that restricts their use in many applicable circumstances.

Conventionally, the windshield wiper frame connector 1 as shown in FIG. 1 is equipped with first, second, and third slots 2, 3, and 4 and an L-shaped recess 5 for receiving both the hook type arm and the pin type arm. However, the windshield wiper frame connector 1 suffers from a number of problems. For example, the difference in depth between the first slot 2 of a pin of the blade unit and the second slot of a rolled bushing of the pin type arm causes instability when the pin type arm is connected to the wiper frame connector 1. Moreover, receiving the hook type arm lacks any locking members that would securely lock the hook type arm to the wiper frame connector. The body 6 of such a wiper frame connector 1 uses much material and is heavy in weight. These characteristics and above stated problems are disadvantages in achieving an efficient and economical windshield wiper assembly.

The windshield wiper frame connector shown in FIGS. 2 and 3 accommodates different size wiper arms. The wiper assembly of this patent suffers from serious drawbacks inherent in the wiper frame structure that prevent proper assembly and disassembly of hook-type wiper arms from the wiper frame and the adaptor.

Other adaptor and wiper frame connector assemblies that accommodate certain bayonet and hook style wipe arms; however, these assemblies cannot accommodate all the necessary connector types required for modern vehicles.

The need therefore exists for an improved versatile windshield wiper frame and adaptor assembly that is easy to assemble and disassemble, particularly for unique hook-type wiper arms.

SUMMARY OF THE INVENTION

The present invention provides an improved windshield wiper bridge and connector assembly for use in a windshield wiper assembly for motor vehicles, that improves the assembly process when compared to the prior art designs. The adaptor is capable of connection to male pin and female wiper arms, straight and two-hole bayonet arms, regular and large hook arms, as well as reverse hook arms. A guide bar provides a stable connection for both large hook-type and reverse hook-type connector arms.

The present invention further provides a windshield wiper bridge design wherein a cutout portion is provided in the lower edge of each bridge member in order to facilitate removal of the hook-type wiper arm when it is affixed to the wiper adaptor.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
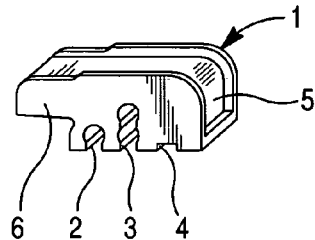
FIG. 1 shows the conventional wiper frame connector.
Figure 2:
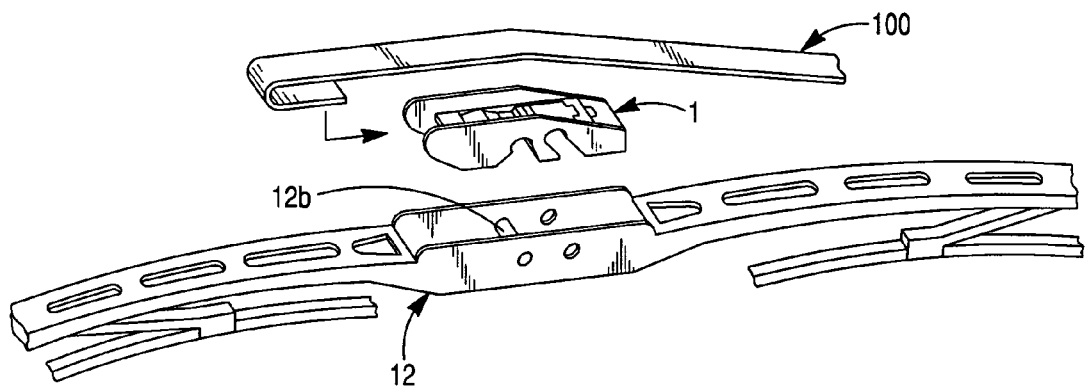
FIG. 2 is a perspective view of a prior art windshield wiper frame connector for a hook type wiper arm.

Referring now to the drawings illustrating preferred embodiments of the present invention, a windshield wiper frame adaptor 10 is designed to be connected to any one of a hook type wiper arm 100 (FIG. 2), a pin type wiper arm 200

Figure 3:
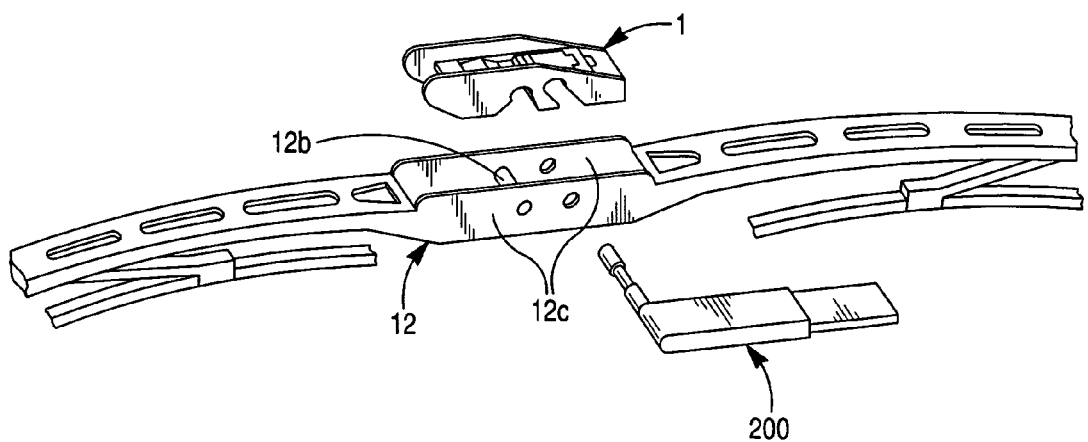
FIG. 3 is a perspective view of a prior art windshield wiper frame connector for a pin type wiper arm.
Figure 4:
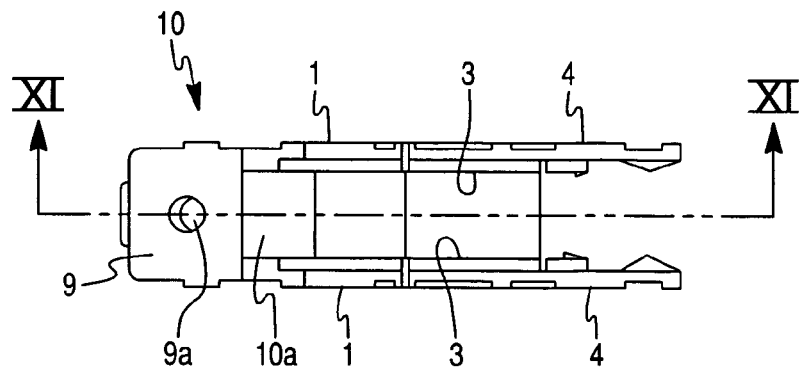
FIG. 4 is a top elevational view of the wiper adaptor according to a preferred embodiment of this invention.
Figure 5:
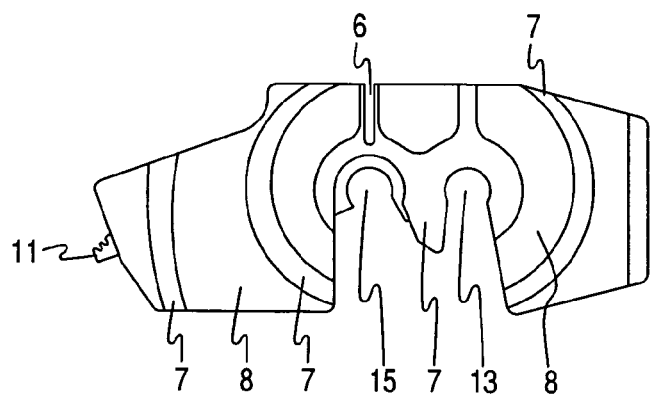
FIG. 5 is a side view of the wiper adaptor of FIG. 4.
Figure 6:
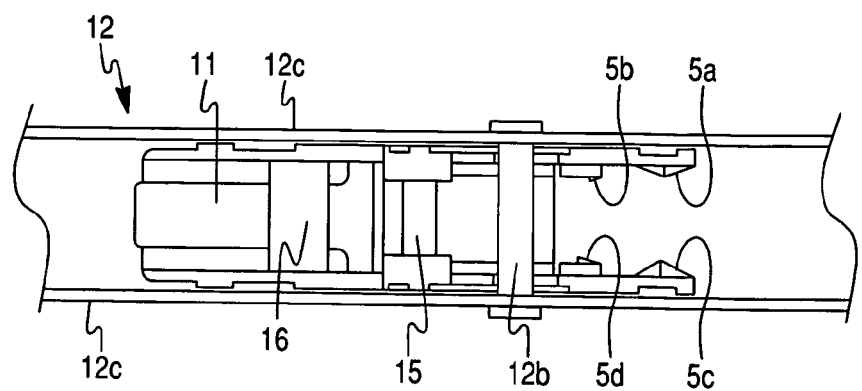
FIG. 6 is a bottom view of the wiper adaptor of FIG. 4 and partial view of the wiper frame.
Figure 7:
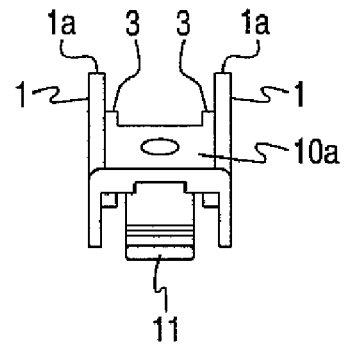
FIG. 7 is a back view of the adaptor of FIG. 4.
Figure 8:
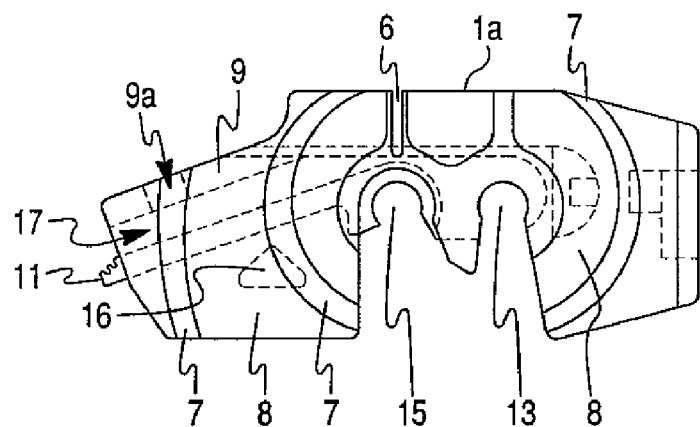
FIG. 8 is an enlarged view of the wiper adaptor of FIGS. 4-7 with hidden lines showing additional features.
Figure 9:
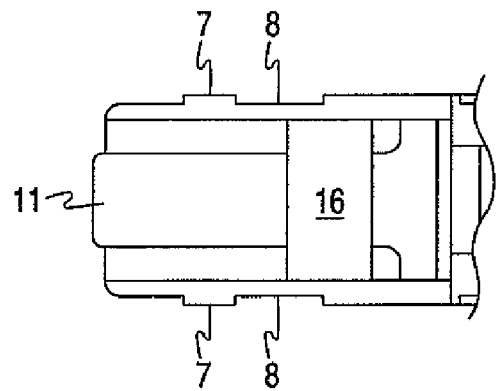
FIG. 9 is an enlarged partial bottom view of the rear portion of the adaptor of FIG. 4 showing the cantilevered release tab and guide bar.

(FIG. 3), or a bayonet type wiper arm (not shown). With reference to FIGS. 4 and 6, the adaptor 10 snugly fits between sidewalls 12c of a wiper frame 12, and it snaps in connecting relation onto a transverse pin 12b. In this manner, a suitable blade unit may be installed as a windshield wiper assembly for a variety of motor vehicles as exemplified by FIGS. 2 and 3.

As shown in FIGS. 4-11, the connector or adaptor 10 comprises a main body (or cross) member 10a having a lower portion 10al and an upper portion 10au, a rear portion 10ar, a pair of sidewalls 1, and a first slot 13 and a second slot 15 disposed in the lower portion 10al of the main body member 10a.

A channel 3 is formed and defined between the sidewalls 1 to accommodate a hook type wiper arm 100. Hook arms 100 of different width may be accommodated within or on top of the channel 3.

The sidewalls 1 each have a wing portion 4 extending forwardly. Two pairs of retention tabs 5a, 5b, 5c, 5d are formed on the inner surface of each of the wing portions 4. Retention tabs 5a, 5b associated with one of sidewalls each extend more inwardly than a corresponding opposite retention tab 5c, 5d. Such an arrangement has been shown to provide a dramatic improvement in the ease of installation and removal of hook type wiper arms.

A transverse notch 6 (See FIG. 5) is formed in each of the sidewalls 1 to promote flexure of the wiper adaptor. In the preferred embodiment, the transverse notch 6 extends downward from a top portion 1a of each sidewall 1. Such an arrangement particularly provides proper flexure when the wiper adaptor is attached to a pin type wiper arm.

Each of the sidewalls 1 has an external surface with raised bearing surfaces 7 (See FIGS. 5 and 14) which bearing directly against the inner surface of the sidewalls 12c of the wiper frame 12 (See FIG. 6). Such raised bearing surfaces 7 are preferably arranged to define recessed radial channels 8. The recessed radial channels 8 provide space for foreign material such as grease and dirt thereby promoting free rotation of the wiper adaptor when pressed between the sidewalls 12c and onto the transverse portion or pin 12b of the main bridge of the wiper blade.

Figure 14:
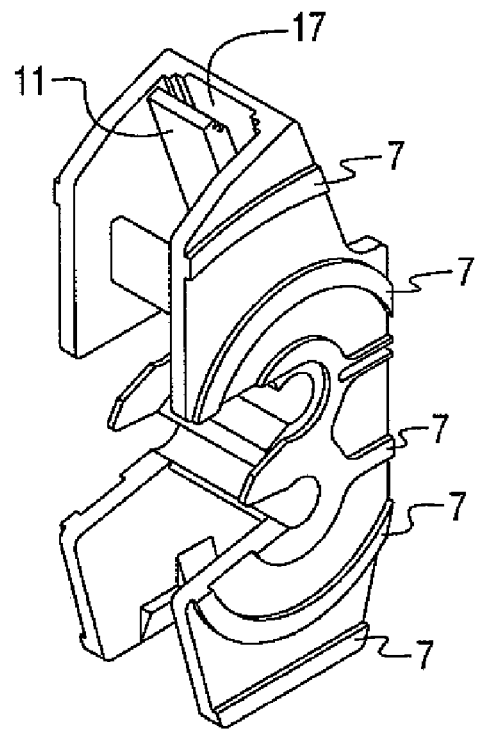
FIG. 14 is the adaptor having the retention tabs disposed on the wing portion of the sidewalls being spread apart as during the assembly/disassembly stage.

The wiper blade has a bayonet retention bore 9a passing through a top wall 9 to receive an extended portion of the bayonet type wiper arm. FIGS. 5, 6, 7, 9 and 14 show a cantilevered release tab 11 extending from the rear portion 10ar of the main body portion 10a. Referring to FIG. 14, a channel 17 is defined between the cantilevered release tab 11 and the bayonet retention top wall 9 to retain the bayonet type wiper arm. The release tab 11 extends substantially more rearwardly than the bayonet retention top wall 9 to facilitate easy removal of the bayonet arm. The release tab 11 is simply depressed at the groove terminal end of the tab 11 such that the release tab deflects downwardly sufficient to allow the extended portion of the bayonet arm to be removed from the bore 9a. Such an arrangement has been shown to ease installation and removal of the bayonet arm.

Figure 15:
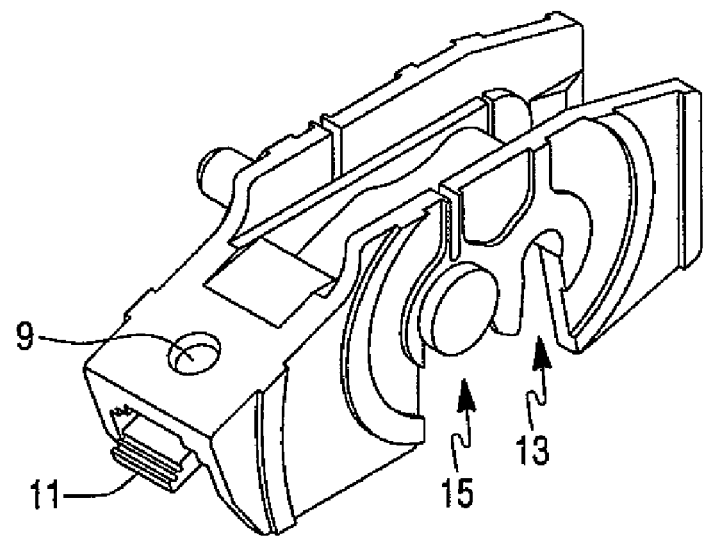
FIG. 15 is a perspective view of the adaptor with an adaptor pin mounted therein.

The first slot 13, preferably a keyhole slot, is provided in the lower portion 10al of the main body member 10a of the wiper adaptor 10 for rotatably receiving and retaining the transverse pin 12b formed on the wiper blade unit. The second slot 15 is also provided in the lower portion 10al of the main body member 10a of the wiper adaptor 10 adjacent the first slot 13. The second slot 15 is adapted to receive and retain a pin of the pin type wiper arm. (See FIG. 15). A raised arc surface is also provided. In the preferred embodiment, the second slot 15 and the raised arc surface have dimensions to enable respective retention of ¼ inch and 3/16 inch diameter pin arms.

Figure 10:
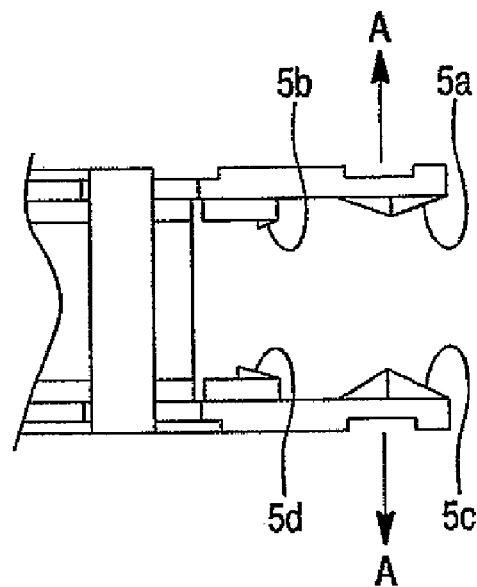
FIG. 10 is an enlarged partial bottom view of the front portion of the wiper adaptor of FIG. 4 showing the retention tabs.
Figure 12:
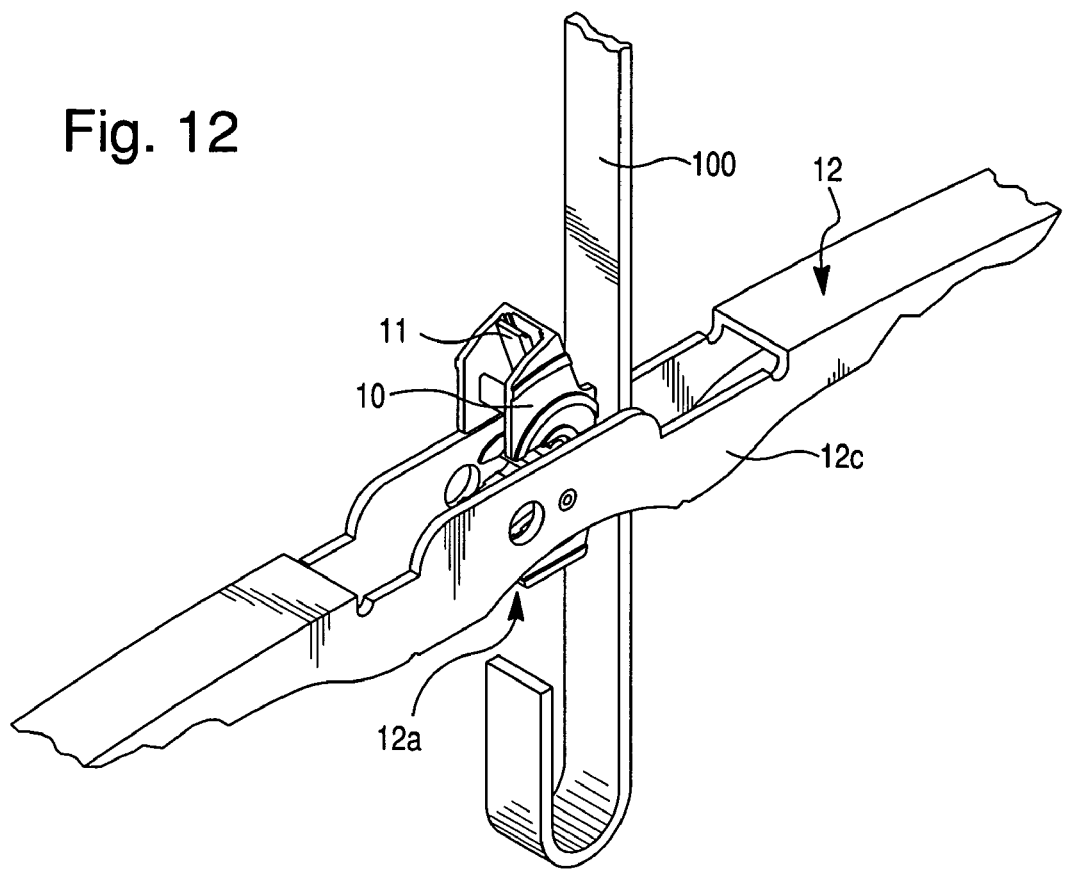
FIG. 12 is a perspective view of the hook-type wiper arm being engaged/disengaged from the wiper blade assembly and adaptor.
Figure 13:
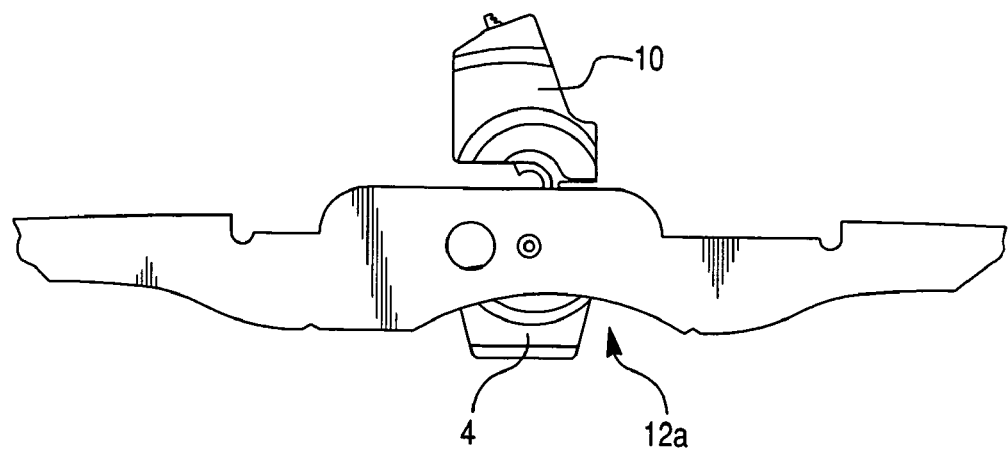
FIG. 13 is a side view showing the main bridge curve or cutout in the middle portion of the wiper frame and the adaptor as disposed during the assembly/disassembly stage.

As seen in FIGS. 12 and 13, in order to remove the hook type wiper arm from the wiper frame, the wiper frame must be rotated to an angle of about 45 to 90 degrees from the hook type wiper arm. The wing portions 4 sidewalls 1 are then spread apart and the hook type wiper arm is released from the retention tabs 5a, 5c. FIG. 10 shows the direction of spread (direction A) for the wing portions 4. To facilitate removal of the hook type wiper arm from the wiper frame, the main bridge of the wiper frame is provided with a cutout or curve 12a as shown in FIGS. 12 and 13. With the cutout or curve 12a, the sidewalls 1 may be easily spread apart without interference or hindrance from the side frame members of the wiper frame 12; thereby permitting the hook-type wiper arm to be released from the retention tabs 5a, 5b, 5c, 5d. The exterior surfaces of the sidewalls 1 of the adaptor 10 maintain a snug-fit relation with the inner surface of the wiper frame sidewalls 12c (See FIG. 6). Therefore, without the cutout or main bride curve 12a, the sidewalls 1 are maintained in an evenly spaced relation and, as a result, the hook type wiper arm cannot effectively be removed from the wiper frame, i.e. they are effectively blocked by the retention tabs.

As a result of the cutout portion 12a, the wing portions 4 and associated retention tabs 5a, 5b, 5c, 5d are permitted to spread to the disengaged state while the adaptor 10 is still affixed to the transverse pin 12b of the wiper frame 12. This improvement is accomplished by the structural and spatial interrelation of the adaptor 10 and the cutout portion 12a formed in the wiper frame 12 (See FIGS. 12 and 13). The prior art designs did not permit efficient and effective removal of the hook-type wiper arm, and as a result, the defective prior art design caused adaptor breakage and wiper failure.

It is noted that the cutout portion 12a is slightly offset from the longitudinal mid-point of the wiper frame in order to align the cutout portion 12a with the wing portions 4 when the adaptor 10 is rotated to approximately 45-90 degrees with respect to the wiper frame (See FIG. 13).

Figure 11:
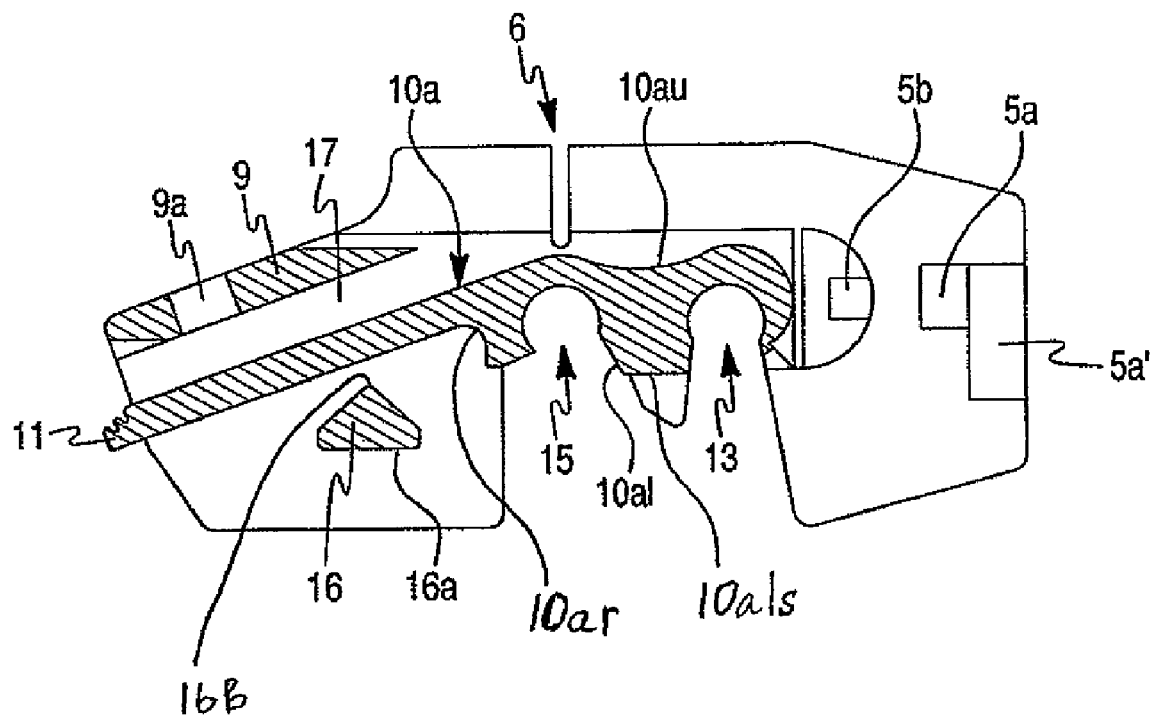
FIG. 11 is a cross sectional view taken along line XI-XI of FIG. 4.
Figure 16:
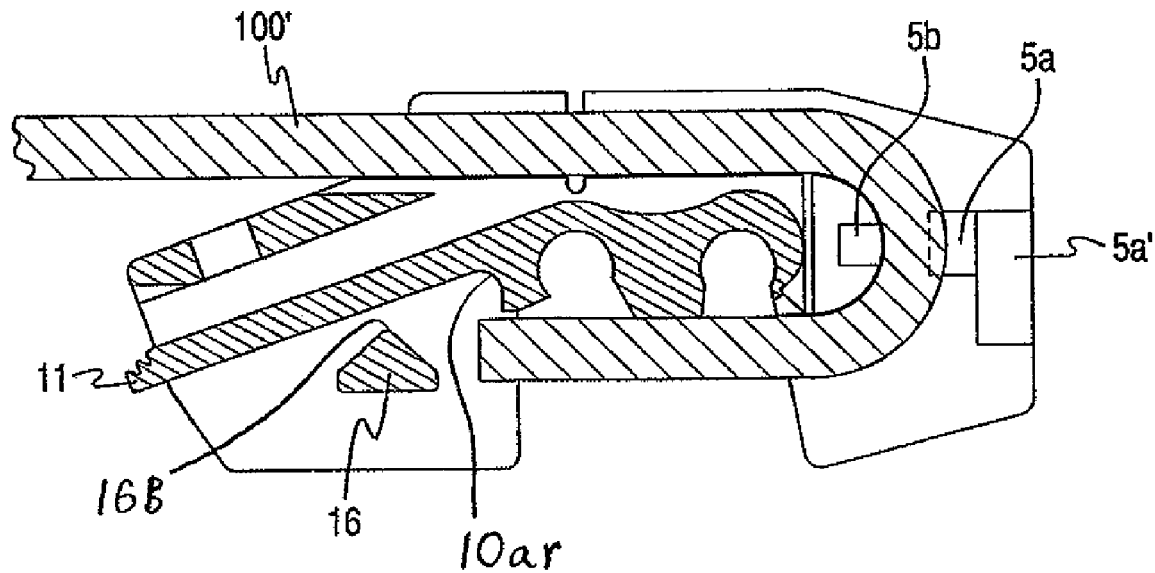
FIG. 16 shows the adaptor used in conjunction with a regular hook type arm.

FIG. 16 shows the adaptor 10 used in conjunction with a regular hook type arm 100' whereby the regular hook type am 100' abuts one angled surface of the retaining ridges or tabs 5a, 5c at the apex of the curved portion of the hook arm 100' and the end of the regular hook type arm 100' rests against a lower surface 10als of the lower portion 10al of the main body member 10a of the wiper adaptor 10 (see also FIG. 11).

Figure 17:
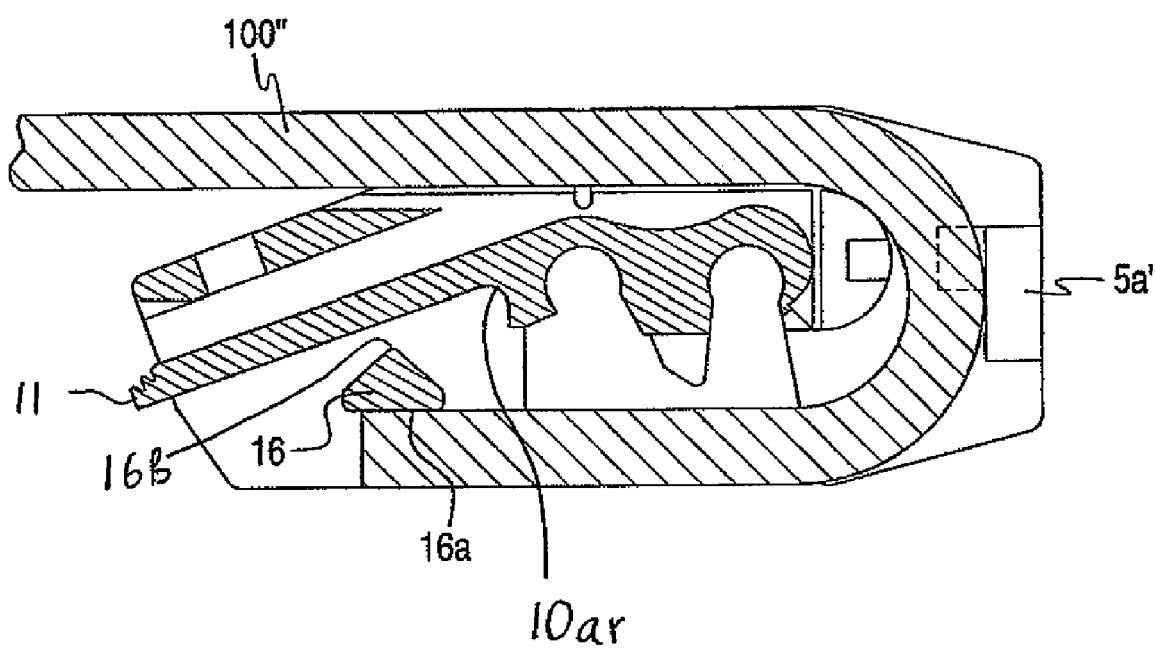
FIG. 17 shows the adaptor used in conjunction with a large hook type arm.
Figure 18:
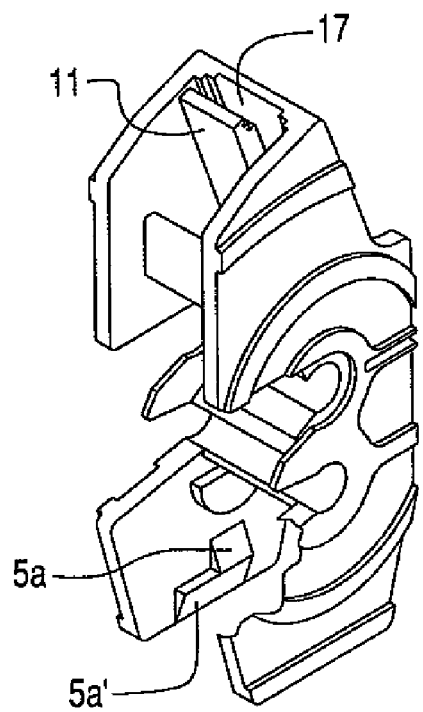
FIG. 18 shows the adaptor from a bottom perspective.

FIG. 17 shows the adaptor 10 used in conjunction with a large hook type arm 100" whereby the large hook type arm 100" abuts the peak of the retaining ridges or tabs 5a, 5c. For the sake of stability, the apex of the curved portion of the hook arm 100" abuts the surface of the wedged shaped surface 5a' and the end of the large hook arm 100" rests against a lower surface 16a of a guide bar 16 defined as a second cross member. (see FIGS. 6, 9, 11 and 17). The guide bar 16 further has an apex 16b provided opposite the lower surface 16a thereof (see FIGS. 11, 16, 17 and 19). As further illustrated in FIG. 17, the guide bar 16 is spaced from the main cross member 10a so that a distance between the apex 16b of the guide bar 16 and the cantilevered release tab 11 of said the cross member 10a is smaller than a thickness of the hook-shaped wiper arm 100" . The wedge-shaped surface 5a' is a sloped surface that defines a raised ridge as shown in the partial view shown in FIG. 18, and the guide bar 16 is a transverse bridge that stabilizes the large hook arm 100".

Figure 19:
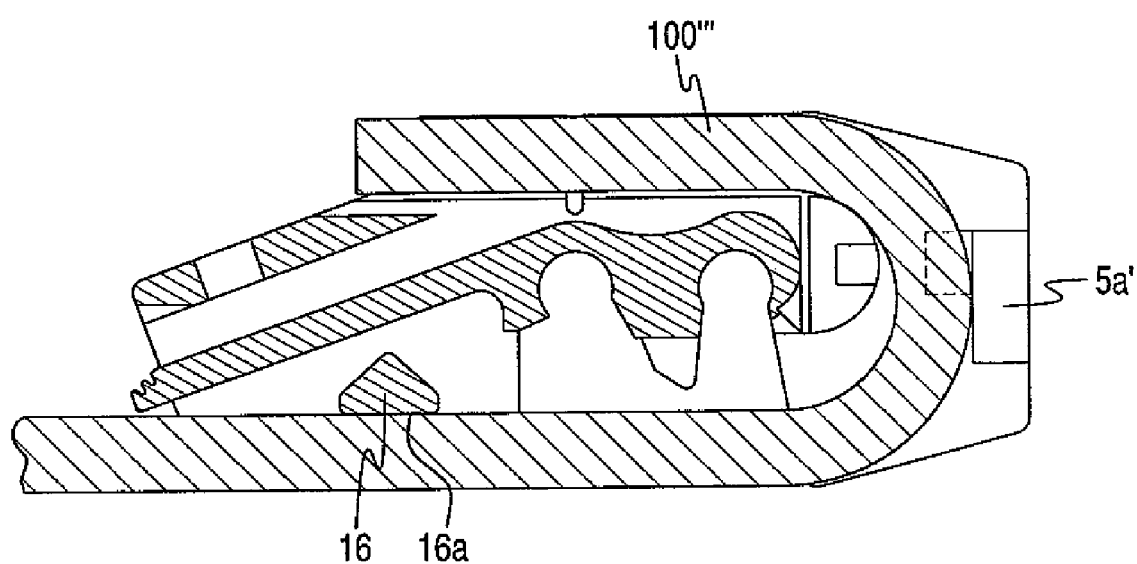
FIG. 19 shows the adaptor used in conjunction with a reverse hook type arm.

FIG. 19 shows the adaptor 10 used in conjunction with a reverse hook type arm 100''' whereby the reverse hook type arm 100''' abuts the peak of the retaining ridges or tabs 5a, 5c.

Like the large hook arm 100", the apex of the curved portion of the reverse hook arm 100''' abuts the surface of the wedged shaped surface 5a' and the straight section of the hook arm 100''' rests against the guide bar 16. (see FIG. 19).

Accordingly, the wiper frame connector 10 of the present invention can be easily used as an adaptor for the blade unit 12 to connect to diverse sized hook shaped wiper arts, such as the regular and large hook type wiper arms 100' and 100" shown in FIGS. 16 and 17, conventional pin type wiper arms, conventional bayonet type wiper arms or the reverse hook type wiper arm 100''' shown in FIG. 19. As illustrated in FIGS. 16, 17 and 19, the sidewalls 1 of the adaptor 10 are raised above the upper portion 10au of the main cross member 10a to a height such that none of the diverse sized hook shaped wiper arms 100', 100" and 100''' extends beyond (above or higher than) the sidewalls 1 in the direction away from the slot 13 of the adaptor 10. Furthermore, the wiper arms are tightly and securely connected to the blade unit 12 so that the wiper connector 10 of the present invention achieves an effective connecting operation and improves the wiping performance of the windshield wiper assembly a well as its operational lifetime.

From the invention described above, it will be obvious that the same may be varied in many ways. Such variations are not to be regarded as a departure from the spirit and scope of the invention, and all such modifications as would be obvious to one skilled in the art are intended to be included in the scope of the following claims.

We claim:

1. A combination of a hook-shaped wiper arm and a windshield wiper adaptor for connecting a wiper blade unit to said hook-shaped wiper arm, said wiper blade unit comprising a wiper blade and a frame assembly supporting the wiper blade, said adaptor comprising:

a pair of spaced apart opposing sidewalls each having an inner and outer surface;

a main cross member formed between and connecting said pair of sidewalls and having an upper portion, a lower portion, a rear portion and a cantilevered release tab extending from said rear portion, said main cross member having a retaining means for selectively retaining said hook-shaped wiper arm and having at least one slot disposed in said lower portion of said cross member for connecting said adaptor to said wiper blade unit;

each of said sidewalls having a wing portion extending forwardly from said main cross member;

a second cross member formed between and connecting said pair of sidewalls separate and spaced from said main cross member, said second cross member defining a guide bar having a lower surface and an apex provided opposite said lower surface, said second cross member spaced from said main cross member so that a distance between said apex of said guide bar and said cantilevered release tab of said main cross member being smaller than a thickness of said hook-shaped wiper arm; and at least two pairs of retention tabs formed on said wing portions, where a portion of one of said retention tabs defines a flat surface facing said main cross member;

said sidewalls being raised above said upper portion of said main cross member to a height such that said hook-shaped wiper arm does not extend above said sidewalls in the direction away from said at least one slot.

2. The combination according to claim 1, wherein said at least two pairs of retention tabs comprise a first pair of retention tabs disposed adjacent said main cross member and a second pair of retention tabs disposed adjacent a terminal end of said wing portions.

3. The combination according to claim 2, wherein each of said second pair of said retention tabs defines a pyramid shape.

4. The combination according to claim 1, wherein said guide bar has a flat surface defining said lower surface.

5. The combination according to claim 1, wherein said guide bar is disposed adjacent said at least one slot at a location that is opposite said wing portions.

6. The combination according to claim 1, wherein said main cross member comprises a rounded surface disposed between said upper and lower portions thereof and facing toward said retention tabs, said rounded surface adapted to engage a corresponding rounded surface of said hook-shaped wiper arm.

7. The combination according to claim 1, further comprising at least one transverse notch extending downwardly from a top portion of each of said sidewalls in a direction toward said upper portion of said main cross member to facilitate flexure of said side walls about a line extending between and substantially orthogonal to said inner surfaces.

8. The combination according to claim 1, wherein said outer surfaces of each of said sidewall having a raised bearing surface defining at least one small radial channel to facilitate free rotation of said adaptor against a vertical member of a wiper main bridge.

9. The combination according to claim 1, wherein said retention tabs are oppositely disposed on said inner surfaces of said wing portions.

10. The combination according to claim 9, wherein said retention tabs disposed on one of said wing portions extends substantially further inward than the corresponding opposite retention tabs disposed on the other wing portion.

11. The combination according to claim 1, wherein said main cross member has a first slot provided for rotatably receiving and retaining a transverse pin formed on said wiper blade unit and a second slot adapted for receiving and retaining a pin of a pin-type wiper arm; both said first and second slots are disposed in said lower portion of said main cross member.

* * * * *